June 9, 1936.  W. D. SANGER  2,043,495
ELECTRICAL MEASURING INSTRUMENT
Filed Aug. 11, 1932  2 Sheets-Sheet 1
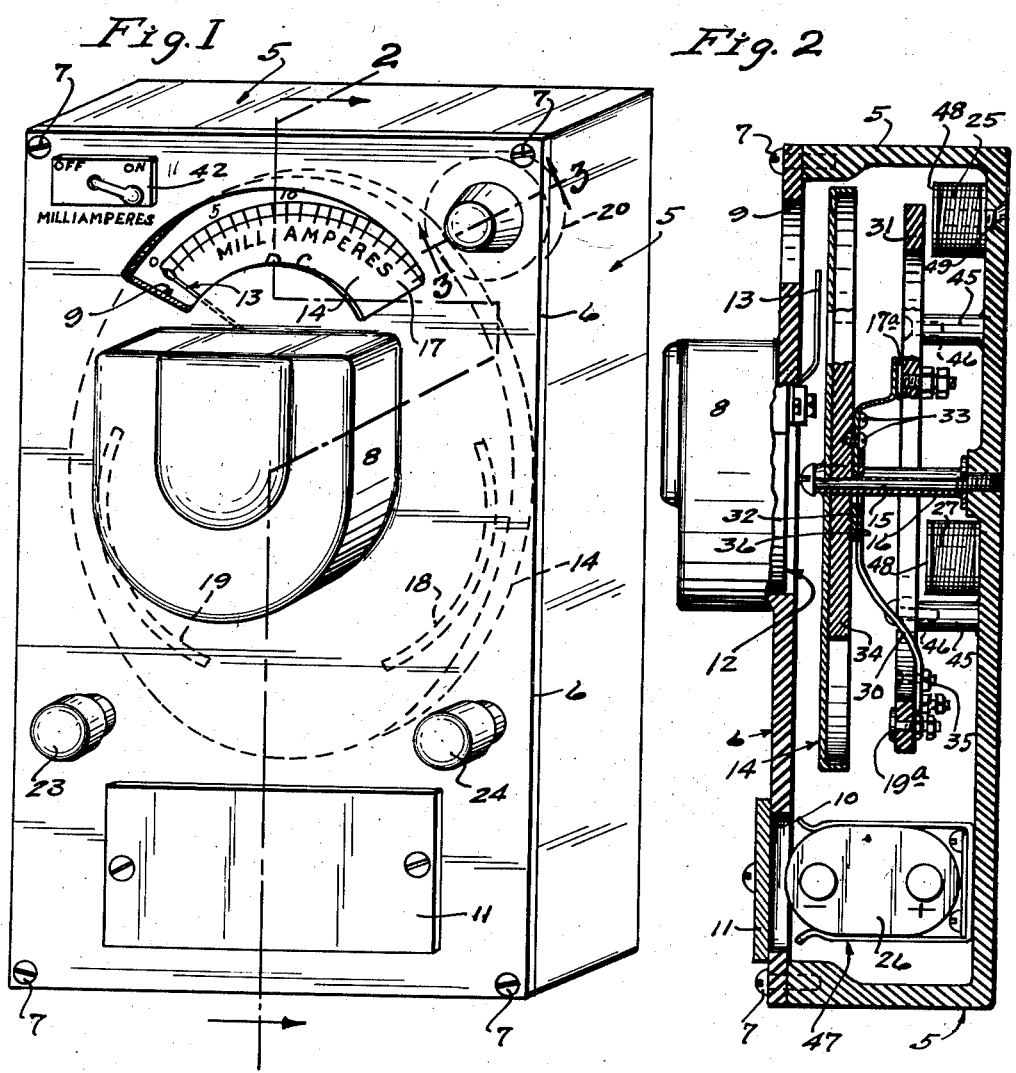
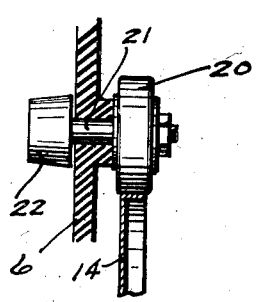
Inventor
Winston D. Sanger
By his Attorneys
Merchant & Kilgore

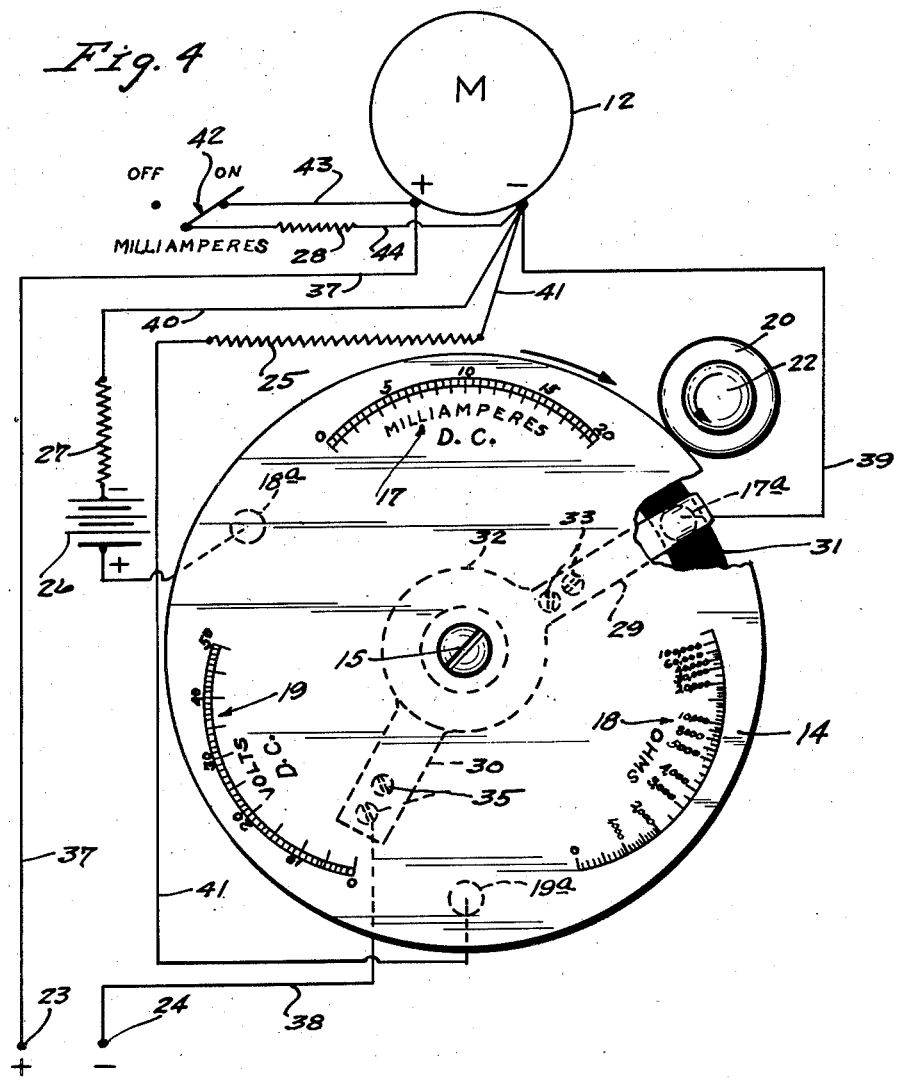

Patented June 9, 1936

2,043,495

UNITED STATES PATENT OFFICE 2,043,495

ELECTRICAL MEASURING INSTRUMENT

Winston D. Sanger, Minneapolis, Minn.

Application August 11, 1932, Serial No. 628,330

13 Claims. (Cl. 171—95)

My present invention relates to electrical measuring instruments of the type wherein a common meter is employed for several classes of measurements.

Hitherto, it has been common practice to provide for the meter proper of an instrument of the class described, a fixed dial having marked thereon a plurality of fixed scales, each serving for directly reading measurements of a different class and all usually being visible at the same time, and to further provide means including appropriate switching mechanism for selectively adapting the meter to measurements of different classes for which it is employed. The number of scales that can advantageously be provided for on the fixed dial of the customarily employed relatively small meter is necessarily limited and in many instances it is not possible to provide a scale for each class of measurements requiring a special scale for direct reading and for which the instrument is employed. In fact, it is usually found that not more than two scales can advantageously be placed upon the dial of a commonly used meter, whereas it is possible and in fact, common practice to employ the meter for numerous different measurements.

The above noted previous practice is objectionable, first, because of the limited number of scales that can advantageously be provided for the meter on the customary fixed dial, and second, because a plurality of scales all visible at the same time are apt to confuse an operator with a result that he may take a reading for one class of measurements on the scale provided for another class, thereby rendering the reading erroneous.

An object of this invention is the provision of a highly efficient instrument of the type described in which the above noted and other objectionable features of hitherto employed instruments are obviated and to this end, I provide for the meter of my improved instrument, a plurality of movable scales, one for each class of measurements and means for selectively moving a desired scale into operative position and, preferably, the improved meter is further provided with switching means operative automatically by movement of a selected scale to an operative position to connect the meter to operate as a meter for a selected class of measurements, whereby the meter of the instrument will be automatically adapted for the class of measurements represented by an operatively positioned scale.

The above and other objects and advantages of the invention will be made apparent from the following specification and claims.

Generally stated, the invention consists of the novel devices, combinations of devices and arrangement of parts hereinafter described and defined in the claims.

In the accompanying drawings, which illustrate the invention, like characters indicate like parts throughout the several views.

Referring to the drawings:

Fig. 1 is a perspective view of one form of the improved apparatus;

Fig. 2 is a sectional view taken on the irregular line 2—2 of Fig. 1, some parts on the section line being shown in full;

Fig. 3 is an enlarged detail sectional view taken on the line 3—3 of Fig. 1; and Fig. 4 is a view illustrating some parts of the apparatus in elevation, with certain portions thereof broken away and further including in diagram, the complete electrical hook-up of the apparatus, in the particular form thereof illustrated.

The apparatus in the form here illustrated is small and readily portable. The parts of the apparatus are mounted within a housing 5 made of suitable insulating material and which includes a cover 6 that is removably secured over the open front of the main body thereof by screws or the like 7. The cover 6 is formed at its outside with an inwardly opening shell-like meter case 8, above said meter case 8 with a segmental sight opening 9, and below said meter case 8 with an aperture 10 that is normally closed by an auxiliary cover plate 11.

The meter of the apparatus indicated as an entirety by the numeral 12 is suitably mounted within the case 8 with its indicating element, which is in the form of a pointer 13, projected into the housing 5 and working beneath the cover 6 with its free end visible through the segmental sight opening 9. The axis of the pointer 13 is common to that of the segmental sight opening 9 and the sight opening is slightly longer than the arc described by the free end of the meter's pivoted pointer 13 during a full movement thereof so that said pointer will always be visible through the sight opening. The particular electrical characteristics of the meter will, of course, depend upon the classes of measurements or ranges of measurements for which the meter is to be employed in a particular case, but for the purpose of the example here illustrated, it may be assumed to be of the direct current type having a movement requiring one milliampere of current for full scale deflection of its pointer 13.

The meter scales of which there are three in the apparatus illustrated, are marked in circumferentially spaced relation upon the face of a scale carrier in the form of a quite large rotary disc-shaped dial 14, that is axially journaled within the housing 5 beneath the meter's pointer 13 to a fixed spindle in the form of a screw 15 that is screw-threaded into the back of the housing 5. The dial disc 14 is provided with a rigidly secured bearing sleeve 16 that is directly journaled on the spindle 15 and extends between the head of said spindle and the back of the housing 5, thereby holding the dial against wobbling or axial movements on said spindle. As will be evident from the drawings, the dial is so located in respect to the sight opening 9 that a peripheral portion thereof will always be visible through the sight opening 9. Of the three scales illustrated, the upper in respect to the drawings and indicated by 17 is calibrated for directly reading milliamperes of direct current in the range of 0 to 20 milliamperes, the right-hand scale is calibrated for directly reading resistance in the range of 0 to 100,000 ohms as designated by 18, and the left-hand scale in respect to the drawings is calibrated for directly reading voltages in the range of 0 to 50 volts and is designated by 19. The axes of the several scales and the axis of the meter's pointer are eccentric to the axis of the dial and are all spaced equi-distant from the axis of said dial so that under rotation of the dial, the several scales will be brought successively into concentric relation with the pointer 13.

As a means for operating the scale carrier dial 14, I provide an operating device in the form of a resilient roller 20 that has peripheral engagement with the scale carrier disc or dial 14. This roller 20 is mounted fast on one end of a spindle 21 that is journaled in the cover 6 and is provided at its projected outer end with a suitable operating knob 22. Obviously, of course, other means for rotating the dial 14 may be employed. For connection of the apparatus to suitable leads, not shown, there are provided on the cover 6, a pair of binding posts, one indicated by 23 and the other by 24, these binding posts being employed for all classes of measurements.

It will, of course, be understood that the meter 12, while primarily a low-range reading milliammeter, can be converted into a meter for various different classes of or ranges of measurements by merely changing the method of connection of the meter to the binding ports 23 and 24 or by making some additional connections between the meter terminals within the device.

In accordance with the present illustration it is only necessary, to convert the meter to a volt meter, to insert in series therewith a resistance indicated by 25 and if this meter be assumed to have an internal resistance of 1,000 ohms per volt, then to extend the range of the meter to indicate voltages in the range of 0 to 50 as for use with the scale 19, this resistance 25 should be approximately 50,000 ohms. Converting the meter 12 to an ohm meter for measurement of resistances in the range of 0 to 100,000 ohms for use with the scale 18, is accomplished by placing in series with the meter, a suitable source of potential difference such as a small battery 26 and a suitable resistance 27. The meter 12 being primarily a milliammeter, it is not necessary to convert the same to that class of measurements, but as the normal range of the meter is only 0 to 1 milliamperes, it will be necessary to increase the range to 0 to 20 milliamperes for use with the scale 17.

For this purpose, I provide a resistance 28 which when shunted across the terminals of the meter, will by-pass current in a ratio of nineteen to one.

For automatically changing the method of connection of the meter to the terminals 23 and 24, so as to adapt the meter to the various classes of measurements represented by the several scales, and in the order of movement of the said scales into an operative position, I provide switching mechanism including fixed contacts 17ª, 18ª and 19ª, and further including a rotary switch arm 29 and a co-operating wiper-acting take-off arm 30. The fixed contacts 17ª, 18ª and 19ª are carried by an annular insulating ring 31, said contacts being equally circumferentially spaced about said ring and said ring being concentric to the axis of the dial 14. The contact arm 29 is provided with a relatively large annular inner end portion 32 that is concentric to but spaced from the bearing sleeve 16 of the dial 14. This movable switch contact arm 29 is secured to and for common movements with the dial 14 by means of screws 33 that are screw-threaded into an insulating disc 34, which disc is secured fast to the inner face of the dial concentric to the axis thereof. The take-off wiper arm 30 is rigidly secured at one end to the insulating ring 31 by means of suitable screws 35, and at its other end is formed with an annular head 36 that is similar to the annular head of the movable switch contact 29, is concentric to the said head of the switch contact 29 and has frictional wiping engagement therewith. It will, of course, be understood that the switch contact 29 is resilient and under spring tension to engage the insulating ring 33 or the fixed contacts thereon and that the wiper 30 is also resilient and exerts a yielding spring tension against the underlying portion of the switch contact 29, to form an electrical take-off therefrom.

The positive terminal of the meter 12 is at all times connected to the binding post 23 by means of a lead 37. The binding post or terminal 24 is at all times connected to the switch contact arm 29 by means of a lead 38 and the wiper arm 30, the lead 38 being connected to the wiper 30 by means of one of the screws 35 which is employed as a terminal post. The fixed contact 17ª is connected directly to the negative terminal of the meter by means of a lead 39. The fixed contact 18ª is connected to the negative terminal of the meter through a lead 40 in which is interposed the battery 26 and the series resistance 27 and the fixed contact 19ª is connected to the negative terminal of the meter by means of a lead 41 having in series therewith the multiplying resistor 25.

By reference to the drawings, particularly Fig. 4, it will be noted that the fixed contacts 17ª, 18ª and 19ª are so spaced that the switch arm 29 will engage the contact 17ª when the milliampere scale 17 is operatively positioned in respect to the meter 12, said switch arm 29 will engage the contact 18ª when the resistance scale 18 is operatively positioned in respect to the meter, and said switch arm 29 will engage the contact 19ª when the volt scale 19 is operatively positioned in respect to the meter.

When the milliampere scale 17 is positioned operatively in respect to the meter, as indicated in the drawings, the negative terminal of the meter will be connected as a low-reading milliammeter and it is necessary to connect the shunt resistance 29 across the terminals of the meter, to employ suitable auxiliary switching means and for this purpose, I provide on the cover of the meter case, a suitable auxiliary switch 42. This switch 42 controls a shunt circuit comprising a lead 43 and a lead 44 having the shunt resistance 28 connected in series therewith.

When the milliampere scale 17 is moved into operative position, it will be necessary to close the switch 42 to thereby connect in the shunt resistance 28 and extend the range of the meter. For all other measurements, the switch 42 will be left open. Obviously, by the use of a more intricate switching mechanism, the shunt resistance 28 could be automatically connected across the terminals of the meter when the milliampere scale was moved into an operative position. When the milliampere scale 18 is operatively positioned in respect to the meter, the switch arm 29, being at that time in engagement with the fixed contact 18ª, the negative terminal of the meter will be connected to the binding post 24 through the battery 26 and its series resistance 27 so that the meter will be automatically adapted to resistance readings in the range indicated on the scale 18, and when the volt scale 19 is operatively positioned in respect to the meter, the switch arm 29 being then in engagement with the fixed switch contact 19ª, the negative terminal meter will be connected to the binding post 24 through the voltage multiplying resistor 25 and the meter will be automatically adapted to voltage measurements in the range indicated on the volt scale 19.

In the above arrangement, the meter is protected to the extent that it will always be connected to operate for the class of measurements indicated on an operatively positioned scale, thereby minimizing the danger of burning the meter mechanism out by possible attempt to utilize the meter for a class of measurement other than that for which it is then connected.

The insulating ring 31 is mounted on lugs 45 that project inwardly from and are formed as an integral part of the back or bottom of the case 5 by means of screws 46 and the battery 26 is removably replaceably mounted in the lower portion of the case 5 in a suitable spring clip bracket 47 directly behind the aperture 10 in the cover 6 and is, when the auxiliary cover plate 11 is removed, accessible for removal and replacement through the said aperture 10. The resistances 26, 27 and 28 may be of any suitable form but as illustrated, are wire wound on spools 48 mounted on the inside back portion of the case 5 by means of screws 49.

What I claim is:

1. In a measuring instrument, a meter having a pivoted indicating element, a scale-carrying element provided with a plurality of segmental scales arranged in circumferentially spaced relation thereabout, the axes of the several segmental scales and the axis of the meter's indicating element being spaced equi-distant from the axis of the scale-carrying element, and means for rotatively moving one of said elements in respect to the other thereof on an axis concentric to that of the scale-carrying element to thereby bring the scales successively into concentric relation to the axis of the pivoted indicating element.

2. The structure defined in claim 1 in which the axes of said scales and pointer are all located radially inward of the several scales.

3. In a measuring instrument, the combination with a dial, of a pointer mounted to move on an axis that is eccentric to the axis of said dial, said dial having a plurality of segmental scales extended on arcs, the axes of said several scales and the axes of said pointer being equidistant from the axis of said dial, whereby said scales may be successively brought into concentric relation to the axis of said pointer.

4. The structure defined in claim 3 in which the axes of said scales and pointer are all located radially inward of the several scales.

5. In a measuring instrument, the combination with a meter that is adaptable by different methods of connection to different classes of measurements and being provided with a pivoted pointer, of a rotary scale carrier having a plurality of scales thereon for different classes of measurements, said scales being circumferentially spaced about the rotary scale carrier and the axis of the said scales and said pointer being equally spaced from the axis of the scale carrier so that said scales will be progressively brought into operative position in respect to the pointer under rotation of the scale carrier, and means for progressively changing the method of connection of the meter under rotation of the scale carrier to adapt the meter to the different classes of measurements represented by the several scales in the order of movement of said scales to operative position, said means including rotary switch mechanism co-axial with the rotary scale carrier and operative in common with the scale carrier.

6. In a measuring instrument, the combination with a meter that is adaptable by different methods of connection to different classes of measurements and being provided with a pivoted pointer, of a rotary scale carrier having a plurality of scales thereon for different classes of measurements, said scales being circumferentially spaced about the rotary scale carrier and the axis of the said scales and said pointer being equally spaced from the axis of the scale carrier so that said scales will be progressively brought into operative position in respect to the pointer under rotation of the scale carrier, and switch mechanism including a rotary and a co-operating plurality of relatively fixed contacts for progressively changing the method of connection of the meter under rotation of the scale carrier to adapt the meter to different classes of measurements represented by the several scales in the order of movement of said scales to operative position, the rotary of said switch contacts being mounted for common rotary movement with the rotary scale carrier and the relatively fixed of said switch contacts being circumferentially spaced about the arc of a circle that is co-axial with the rotary of said switch contacts and the scale carrier.

7. In a measuring instrument, a meter that is adapted to different classes of measurements when differently connected and having a pivoted pointer and scale-carrying element provided with a plurality of segmental scales arranged in circumferentially spaced relation about a circle having its axis on said carrier, the axis of the several scales and the axis of the indicating element being spaced equi-distant of the axis of the circle about which the scales are spaced, means for rotatively moving one of said elements in respect to the other thereof on an axis concentric to that of the circle about which the several scales are spaced to thereby bring the scales successively into concentric relation with the axis of the pivoted indicating element, means for progressively changing the method of connection of the meter under rotation of the scale carrier to adapt the meter to different classes of measurements represented by the several scales and in the order of movement of said scales to operative position, said means including rotary switch mechanism co-axial with the rotary of said elements and operative in common therewith.

8. An electrical instrument having indicating means, permutable circuits therefor, selectable indicating scales corresponding to the permutations of said circuits said scales appearing in a substantially cyclic order, and means for automatically permuting said circuits by the selection of said scales.

9. In electrical measuring instruments having a meter movement, a plurality of meter-movement circuits, each connectable to said movement, and a plurality of conterminous indicating scales each corresponding to a said circuit, means for simultaneously selecting a desired scale and connecting a corresponding circuit to said movement.

10. In electrical instruments having an indicating mechanism and a plurality of circuits selectively connectible thereto, means carrying a plurality of scales appearing in rotation, means to position a said scale with respect to said mechanism, and means operable by said positioning means to connect a said circuit to said mechanism.

11. An electrical indicating instrument comprising a casing, an indicator, an indicator movement, a member having a plurality of indicator scales positionable in rotation with respect to said indicator to bring a said scale into reading position, shield means permitting only one scale to be in reading position at a time, positioning means supported by said casing to position said member, a plurality of indicator-movement circuits, switching means operable to connect a said circuit to said movement, and actuating means connecting said positioning means and said switching means whereby a said circuit corresponding to a said scale is connected to said movement by the operation of said positioning means, said casing having connection means whereby an external circuit can be connected to said switching means.

12. An electric meter of the plural scale class comprising a meter movement, selectable auxiliary connections therefor, a selectively movable scale member having scales arranged substantially end to end, and means for selectively connecting said auxiliary connections to said movement responsive to selective movements of said scale member.

13. An electric indicator including indicating means, a positionable multiple scale member having serially extended scales, circuit connections corresponding to said scales, and means operable to position said scales and select corresponding circuits simultaneously.

WINSTON D. SANGER.